United States Patent [19]
Gosling

[11] Patent Number: 5,748,964
[45] Date of Patent: May 5, 1998

US005748964A

[54] BYTECODE PROGRAM INTERPRETER APPARATUS AND METHOD WITH PRE-VERIFICATION OF DATA TYPE RESTRICTIONS

[75] Inventor: James A. Gosling, Woodside, Calif.

[73] Assignee: Sun Microsystems, Inc., Palo Alto, Calif.

[21] Appl. No.: 360,202

[22] Filed: Dec. 20, 1994

[51] Int. Cl.$^6$ .................................................... G06F 9/45
[52] U.S. Cl. ............................... 395/705; 395/406 R
[58] Field of Search .................................. 395/700, 650, 395/800, 672, 673, 705, 406 R; 364/200

[56] References Cited

U.S. PATENT DOCUMENTS

| | | | |
|---|---|---|---|
| 3,878,513 | 4/1975 | Werner | 711/154 |
| 4,521,851 | 6/1985 | Trubiskey et al. | 395/394 |
| 4,524,416 | 6/1985 | Stanley et al. | 711/200 |
| 5,422,992 | 6/1995 | Motoyama et al. | 707/516 |
| 5,446,875 | 8/1995 | Ogisu et al. | 395/180 |

FOREIGN PATENT DOCUMENTS

| | | | |
|---|---|---|---|
| 0424056A2 | 4/1991 | European Pat. Off. | G05B 19/05 |
| 95120052 | 10/1996 | European Pat. Off. | |

OTHER PUBLICATIONS

"An Efficient Implementation of Self, a Dynamically–typed Object Oriented Languge Based on Prototypes" ACM Press Oct. 1–6 1989, by Craig Chamber et al.

"Post Script Language Reference Manual" Addison–Wesley Publishing Company, 1985.

"Designing an Efficient Language" Aug. 1986, Byte. Charles B. Duff.

"Character Simulation with Scriptx", A General Purpose Frame Work for Dynamic Behavior Nov. 1994.

Franks, Neville, Dr. Dobb's Journal, v16, n9, p.34(6), Sep. 1991. "Adding an Extension Language to Your Software: the Little Language Interface".

David Betz, Dr. Dobb's Journal, v16, n9, p.26(8) Sep. 1991 "Your Own Tiny Object–oriented Language; C++., Smalltalk? What About Bob?".

David Betz, Dr. Dobb's Journal v16, n/1, p.74(4), Oct. 1993, "Dave's Reyeled ooLanguge: Drool Over a Little Language That Sports Multiple Inlertome".

David Betz, Byte, Nov. 1988, p. 419; vol. 13, No. 12, Embedded Language; Extalk. Allows Used to Extend to Capabilities Your Application Program.

"ACM Sig Plan Notices", vol. 30, Nov. 3, Mar. 1995 Sig plan Workshop on Intermediate Representation (TR'95, Jan. 22, 1995).

(List continued on next page.)

*Primary Examiner*—Alvin Oberly
*Assistant Examiner*—St. John Courtenay, III
*Attorney, Agent, or Firm*—Gary S. Williams; Flehr Hohbach Test Albritton & Herbert LLP

[57] ABSTRACT

A program interpreter for computer programs written in a bytecode language, which uses a restricted set of data type specific bytecodes. The interpreter, prior to executing any bytecode program, executes a bytecode program verifier procedure that verifies the integrity of a specified program by identifying any bytecode instruction that would process data of the wrong type for such a bytecode and any bytecode instruction sequences in the specified program that would cause underflow or overflow of the operand stack. If the program verifier finds any instructions that violate pre-defined stack usage and data type usage restrictions, execution of the program by the interpreter is prevented. After pre-processing of the program by the verifier, if no program faults were found, the interpreter executes the program without performing operand stack overflow and underflow checks and without performing data type checks on operands stored in operand stack. As a result, program execution speed is greatly improved.

14 Claims, 11 Drawing Sheets

OTHER PUBLICATIONS

"The VLISP Verified Scheme System", pp. 41–62 An International Journal 8, 33–100(1995) Kluwer, Academiz Publisher, Boston.

King, J.C. "A Program Verifier", North Holland Publishing Co, Amesterdam, Netherlands, 1972, vol. 1, pp. 234–249.

Corinna Kinchim, Exe, v6, n1, p.66(5), Jun. 1991. "Post Script: PS zt's programming".

Cardell, L, Conference 6–10 May 1985 "The Amber Machine".

Seybold Report on Desktop Publishing (v5, n7, p.(9)(1), Mar. 4, 1991 "A Postsript Backgrounder".

"Small talk–80, The Language and its Implementation" Adele Goldberb and David Robson. Addison–Wesley–Publishing Company 1983.

Ken Thompson, "Regular Expression Search Algorithm," *Communications of the ACM*, Jun. 1968, vol. 11, No. 6, pp. 419–422.

Kin–Man Chung and Herbert Yuen, "A 'Tiny' Pascal Compiler; Part 1: The P–Code Interpreter," *BYTE Publications, Inc.*, Sep. 1978.

Kin–Man Chung and Herbert Yuen, "A 'Tiny' Pascal Compiler; Part 2: The P–Compiler," *BYTE Publications, Inc.*, Oct. 1978.

Gene McDaniel, "An Analysis of a Mesa Instruction Set," *Association for Computing Machinery*, May 1982.

Kenneth A. Pier, "A Retrospective on the Dorado, A High–Performance Personal Computer," *IEEE Computer Society, 10th Annual Intl. Symposium on Computer Architecture*, 1983, pp. 252–269.

James G. Mitchell, et al., "Mesa Language Manual," *Xerox Corporation, Palo Alto Research Center*.

Schauer, H., "Architektur und Implementierung eines PASCAL–Systems für Mikrocomputer", Elektronische Rechenanlagen, vol. 24 (1982), Jun. No. 3, pp. 108–117.

Perrott, R.H., et al., "A Supercomputer Program Development System", Software Practice & Experience 17 (1987) Oct., No. 10, pp. 663–683.

Wright, Andrew K., et al., "A Practical Soft Type System for Scheme", LISP 94–Jun./1994 Orlando, Florida, pp. 250–262.

Gosling, James, "Java Intermediate Bytecodes", ACM Sigplan Workshop on Intermediate Representation (IR '95), Jan. 1995, San Francisco, California, pp. 111–118.

| FIGURE 4A |
| FIGURE 4B |
| FIGURE 4C |
| FIGURE 4D |
| FIGURE 4E |
| FIGURE 4F |
| FIGURE 4G |

BYTECODE PROGRAM INTERPRETER APPARATUS AND METHOD WITH PRE-VERIFICATION OF DATA TYPE RESTRICTIONS

BACKGROUND OF THE INVENTION

1. Field of the Invention

The present invention relates generally to the use of computer software on multiple computer platforms which use distinct underlying machine instruction sets, and more specifically to an efficient program interpreter and method which efficiently handles data type usage checks and operand stack usage checks.

2. Prior Art

As represented generally in FIG. 1, in a typical prior art networked computer system 100, a first computer 102 may download a computer program 103 residing on a second computer 104. In this example, the first user node 102 will typically be a user workstation having a central processing unit 106, a user interface 108, a primary memory 110 (e.g., random access memory) for program execution, a secondary memory 112 (e.g., a hard disc) for storage of an operating system 113, programs, documents and other data, and a modem or other communication interface 114 for connecting to a computer network 120 such as the Internet, a local area network or a wide area network. The computers 102 and 104 are often called "nodes on the network" or "network nodes."

The second computer 104 will often be a network server, but may be a second user workstation, and typically would contain the same basic array of computer components as the first computer.

In the prior art, after the first computer 102 downloads a copy of a computer program 103 from the second computer 104, there are essentially no standardized tools available to help the user of the first computer 102 to verify the integrity of the downloaded program 103. In particular, unless the first computer user studies the source code of the downloaded program, it is virtually impossible using prior art tools to determine whether the downloaded program 103 will underflow or overflow its stack, or whether the downloaded program 103 will violate files and other resources on the user's computer.

A second issue with regard to downloading computer software from one computer to another concerns transferring computer software between computer platforms which use distinct underlying machine instruction sets. There are some prior art examples of platform independent computer programs and platform independent computer programming languages. However, the prior art also lacks tools for efficiently executing such platform independent computer programs while guarding against violation of data type usage restrictions and operand stack usage restrictions.

SUMMARY OF THE INVENTION

The present invention concerns a program interpreter for computer programs written in a bytecode language, to be commercialized as the OAK language, which uses a restricted set of data type specific bytecodes. All the available source code bytecodes in the language either (A) are stack data consuming bytecodes that have associated data type restrictions as to the types of data that can be processed by each such bytecode, (B) do not utilize stack data but affect the stack by either adding data of known data type to the stack or by removing data from the stack without regard to data type, or (C) neither use stack data nor add data to the stack.

The interpreter or the present invention, prior to executing any bytecode program, executes a bytecode program verifier procedure that verifies the integrity of a specified program by identifying any bytecode instruction that would process data of the wrong type for such a bytecode and any bytecode instruction sequence in the specified program that would cause underflow or overflow of the operand stack. If the program verifier finds any instructions that violate predefined stack usage and data type usage restrictions, execution of the program by the interpreter is prevented.

The bytecode program verifier aspect of the present invention includes a virtual operand stack for temporarily storing stack information indicative of data stored in a program operand stack during the execution a specified bytecode program. The verifier processes the specified program by sequentially processing each bytecode instruction of the program, updating the virtual operand stack to indicate the number, sequence and data types of data that would be stored in the operand stack at each point in the program. The verifier also compares the virtual stack information with data type restrictions associated with each bytecode instruction so as to determine if the operand stack during program execution would contain data inconsistent with the data type restrictions of the bytecode instruction, and also determines if any bytecode instructions in the specified program would cause underflow or overflow of the operand stack.

To avoid detailed analysis of the bytecode program's instruction sequence flow, and to avoid verifying bytecode instructions multiple times, all points (called multiple-entry points) in the specified program that can be can be immediately preceded in execution by two or more distinct bytecodes in the program are identified. In general, at least one of the two or more distinct bytecodes in the program will be a jump/branch bytecode. During pre-processing of the specified program, the verifier takes a "snapshot" of the virtual operand stack immediately prior to each multiple-entry point (i.e., subsequent to any one of the preceding bytecode instructions), compares that snapshot with the virtual operand stack state after processing each of the other preceding bytecode instructions for the same multiple-entry point, and generates a program fault if the virtual stack states are not identical.

After pre-processing of the program by the verifier, if no program faults were found, the interpreter executes the program without performing operand stack overflow and underflow checks and without performing data type checks on operands stored in operand stack. As a result, program execution speed is greatly improved.

BRIEF DESCRIPTION OF THE DRAWINGS

The accompanying drawings, which are incorporated in and form a part of this specification, illustrate embodiments of the invention and, together with the description, serve to explain the principles of the invention, wherein.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
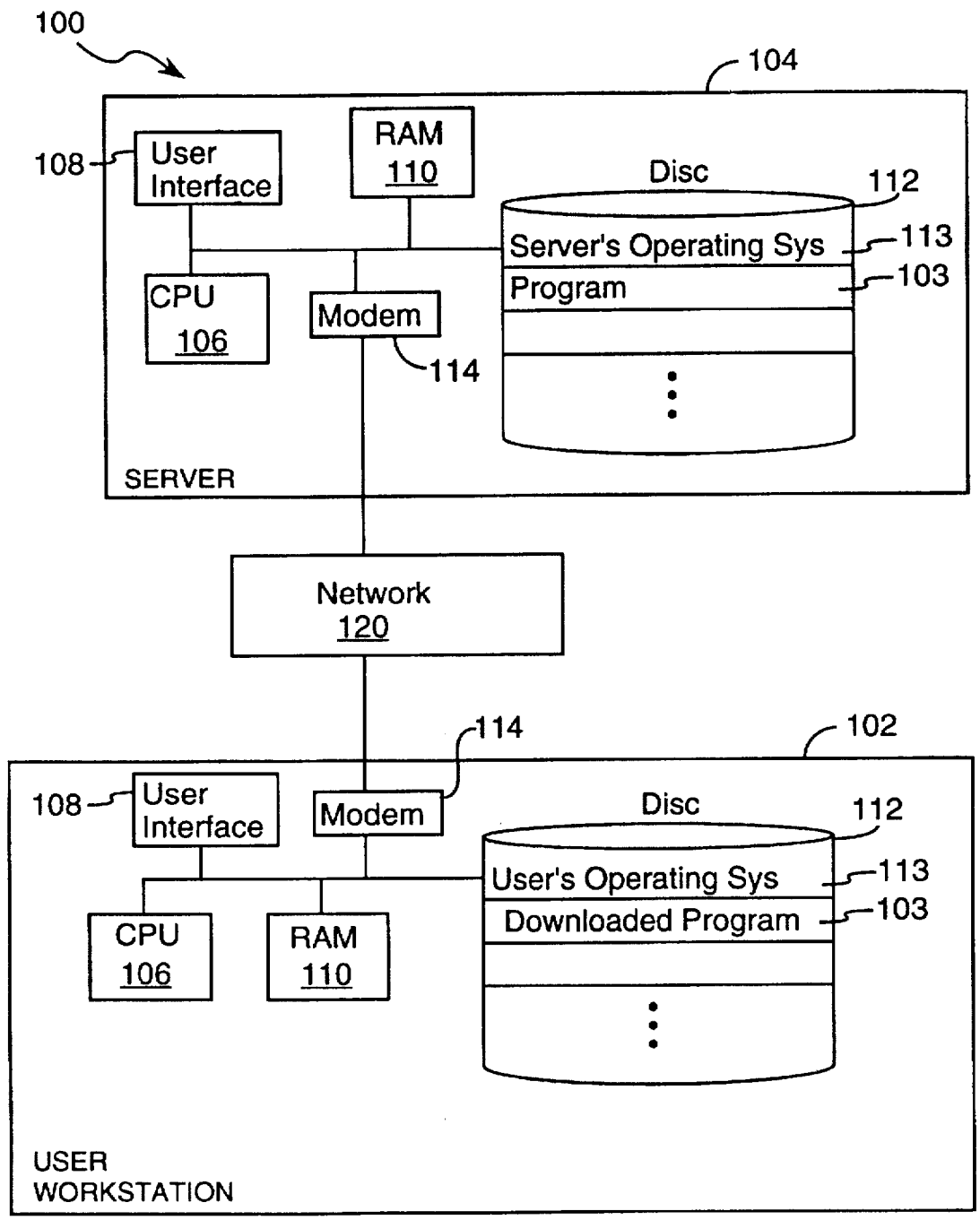
FIG. 1 depicts two computers interconnected via a network.
Figure 2:
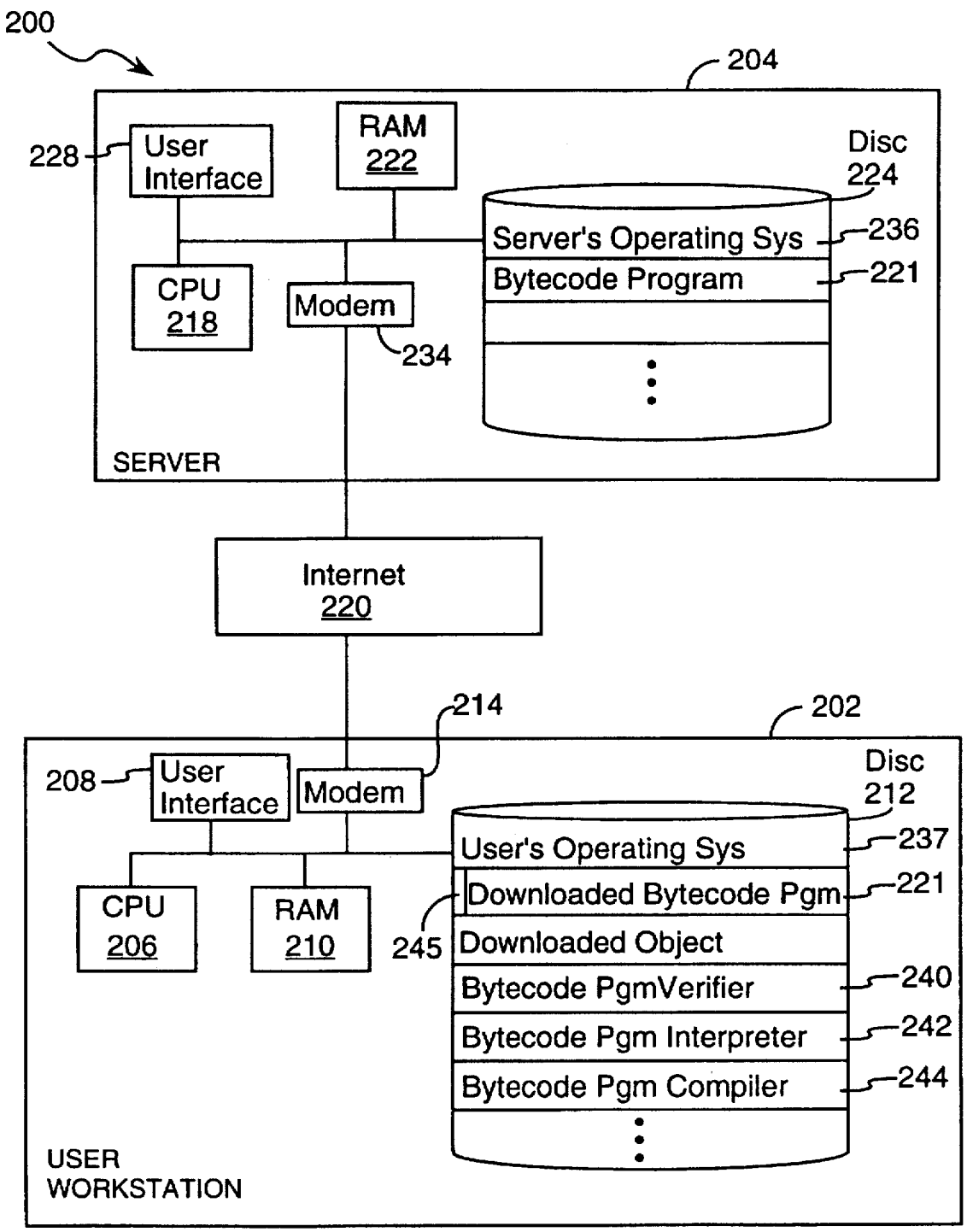
FIG. 2 depicts two computers interconnected via a network, at least one of which includes a bytecode program verifier in accordance with the present invention.

Referring now to a distributed computer system 200 as shown in FIG. 2, a first computer node 202 is connected to a second computer node 204 via a computer communications network such as the Internet 220. The first computer node 202 includes a central processing unit 206, a user interface 208, primary memory (RAM) 210, secondary memory (disc storage) 212, and a modem or other communication interface 214 that connects the first computer node 202 to the computer communication network 220. The disc storage 212 stores programs for execution by the processor 206, at least one of which is a bytecode program 221 which is of executable form. For the purposes of this description, it will be assumed that the first computer node 202 receives the bytecode program 221 from the second computer node 204 via the computer communications network 220 using file transfer protocols well known to those skilled in the art.

In the preferred embodiment, the bytecode program is written as an OAK application, which when compiled or interpreted will result in a series of executable instructions. A listing of all the source code bytecode instructions in the OAK instruction set is provided in Table 1. The OAK instruction set is characterized by bytecode instructions that are data type specific. Specifically, the OAK instruction set distinguishes the same basic operation on different primitive data types by designating separate opcodes. Accordingly, a plurality of bytecodes are included within the instruction set to perform the same basic function (for example to add two numbers), with each such bytecode being used to process only data of a corresponding distinct data type. In addition, the OAK instruction set is notable for instructions not included. For instance, there are no "computed goto" instructions in the OAK language instruction set, and there are no instructions for modifying object references or creating new object references (other than copying an existing object reference). These two restrictions on the OAK instruction set, as well as others, help to ensure that any bytecode program which utilizes data in a manner consistent with the data type specific instructions in the OAK instruction set will not violate the integrity of a user's computer system.

In the preferred embodiment, the available data types are integer, long integer, short integer (16 bit signed integer), single precision floating point, double precision floating point, byte, character, and object pointer (sometimes herein called an object reference). The "object reference" data type includes a virtually unlimited number of data subtypes because each "object reference" data type can include an object class specification as part of the data type. In addition, constants used in programs are also data typed, with the available constant data types in the preferred embodiment comprising the data types mentioned above, plus class, fieldref, methodref, string, and Asciz, all of which represent two or more bytes having a specific purpose.

The few bytecodes that are data type independent perform stack manipulation functions such as (A) duplicating one or more words on the stack and placing them at specific locations within the stack, thereby producing more stack items of known data type, or (B) clearing one or more items from the stack. A few other data type independent bytecode do not utilize any words on the stack and leave the stack unchanged, or add words to the stack without utilizing any of the words previously on the stack. These bytecodes do not have any data type restrictions with regard to the stack contents prior to their execution, and all but a few modify the stack's contents and thus affect the program verification process.

The second computer node 204, assumed here to be configured as a file or other information server, includes a central processing unit 218, a user interface 228, primary memory (RAM) 222, secondary memory (disc storage) 224, and a modem or other communication interface 234 that connects the second computer node to the computer communication network 220. The disc storage 224 stores programs for execution by the processor 218 and/or distribution to other computer nodes.

The first and second computer nodes 202 and 204 may utilize different computer platforms and operating systems 236, 237 such that object code programs executed on either one of the two computer nodes cannot be executed on the other. For instance, the server node 204 might be a Sun Microsystems computer using a Unix operating system while the user workstation node 202 may be an IBM compatible computer using an 80486 microprocessor and a Microsoft DOS operating system. Furthermore, other user workstations coupled to the same network and utilizing the same server 204 might use a variety of different computer platforms and a variety of operating systems.

In the past, a server 204 used for distributing software on a network having computers of many types would store distinct libraries of software for each of the distinct computer platform types (e.g., Unix, Windows, DOS, Macintosh, etc.). Thus, different versions of the same computer program might be stored in each of the libraries. However, using the present invention, many computer programs could be distributed by such a server using just a single, bytecode version of the program.

As shown in FIG. 2, the first computer node 202 stores in its secondary memory 212 a bytecode verifier program 240 for verifying the integrity of specified bytecode programs and a bytecode interpreter 242 for executing specified bytecode programs. Alternately, or in addition, the first computer node 202 may store a bytecode compiler 244 for converting a verified bytecode program into an object code program for more efficient execution of the bytecode program 221 than by the interpreter 244.

The bytecode verifier 240 is an executable program which verifies operand data type compatibility and proper stack manipulations in a specified bytecode (source) program 221 prior to the execution of the bytecode program 221 by the processor 206 under the control of the bytecode interpreter 242. Each bytecode program 103 has an associated verification status value 245 that is initially set to False when the program is downloaded from another location. The verification status value 245 for the program is set to True by the bytecode verifier 240 only after the program has been verified not to fail any of the data type and stack usage tests performed by the verifier 240.

During normal execution of a program by an interpreter, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program.

In addition, the downloaded bytecode program may contain errors involving the data types of operands not matching the data type restrictions of the instructions using those operands, which may cause the program to be fail during execution. Even worse, a bytecode program might attempt to create object references (e.g., by loading a computed number into the operand stack and then attempting to use the computed number as an object handle) and to thereby breach the security and/or integrity of the user's computer.

Use of the bytecode verifier 240 in accordance with the present invention enables verification of a bytecode program's integrity and allows the use of an interpreter 242 which does not execute the usual stack monitoring instructions during program execution, thereby greatly accelerating the program interpretation process.

The Bytecode Program Verifier

Figure 3:
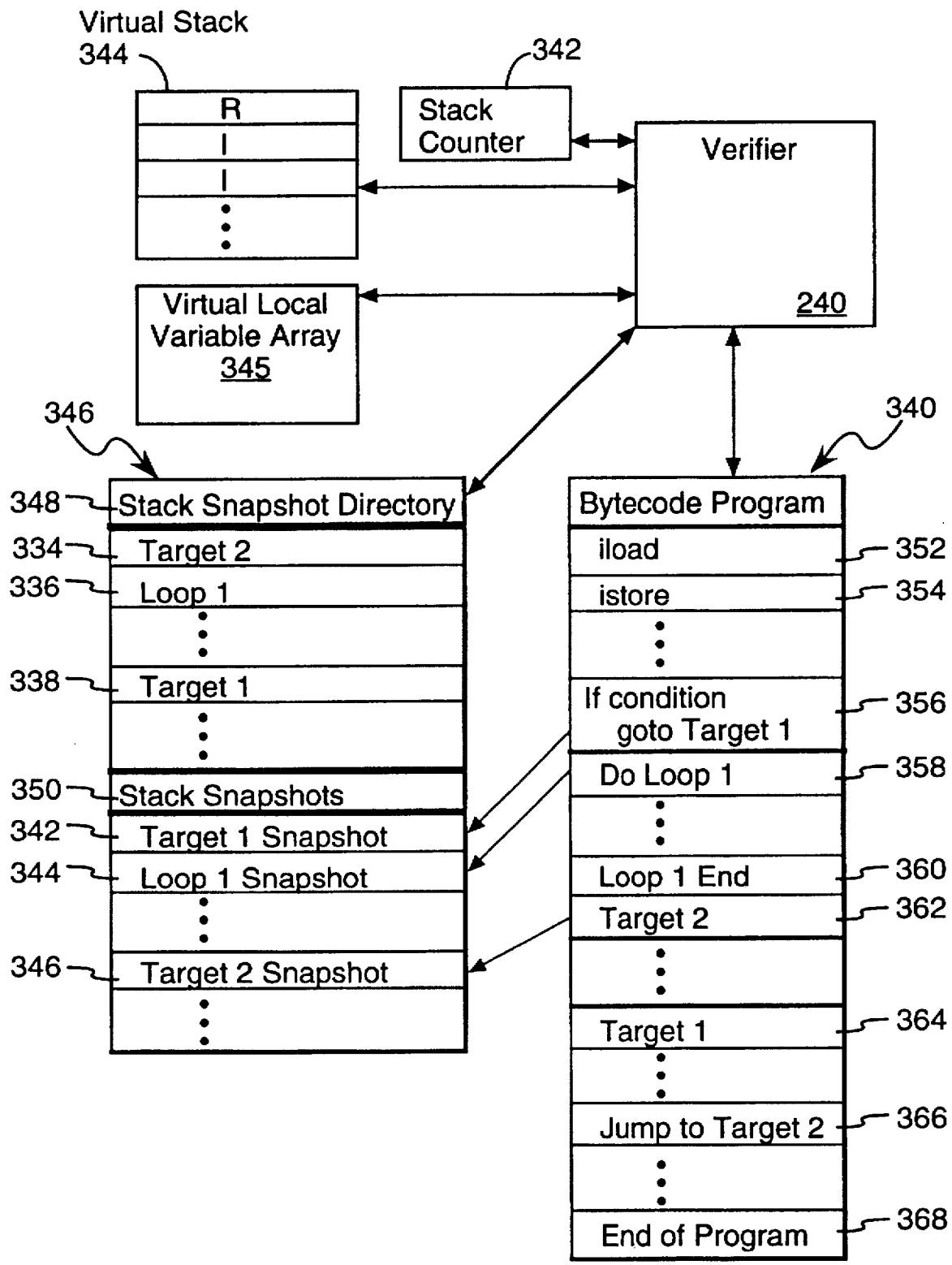
FIG. 3 depicts data structures maintained by a bytecode verifier during verification of a bytecode program in accordance with the present invention.

Referring now to FIG. 3, the execution of the bytecode program verifier 240 will be explained in conjunction with a particular bytecode program 340. The verifier 240 uses a few temporary data structures to store information it needs during the verification process. In particular, the verifier 240 uses a stack counter 342, a virtual stack 344, a virtual local variable array 345, and a stack snapshot storage structure 346.

The stack counter 342 is updated by the verifier 240 as it keeps track of the virtual stack manipulations so as to reflect the current number of virtual stack 320 entries.

The virtual stack 344 stores data type information regarding each datum that will be stored by the bytecode program 340 in the operand stack during actual execution. In the preferred embodiment, the virtual stack 344 is used in the same way as a regular stack, except that instead of storing actual data and constants, the virtual stack 344 stores a data type indicator value for each datum that will be stored in the operand stack during actual execution of the program. Thus, for instance, if during actual execution the stack were to store three values:

| HandleToObjectA |
| --- |
| 5 |
| 1 | the corresponding virtual stack entries will be

| R |
| --- |
| I |
| I | where "R" in the virtual stack indicates an object reference and each "I" in the virtual stack indicates an integer. Furthermore, the stack counter 342 in this example would store a value of 3, corresponding to three values being stored in the virtual stack 344.

Data of each possible data type is assigned a corresponding virtual stack marker value, for instance: integer (I), long integer (L), single precision floating point number (F), double precision floating point number (D), byte (B), short (S), and object reference (R). The marker value for an object reference will often include an object class value (e.g., R:point, where "point" is an object class).

The virtual local variable array 345 serves the same basic function as the virtual stack 344. That is, it is used to store data-type information for local variables used by the specified bytecode program. Since data is often transferred by programs between local variables and the operand stack, the bytecode instructions performing such data transfers and otherwise using local variables can be checked to ensure that the local variables accessed by each bytecode instruction are consistent with the data type usage restrictions on those bytecode instructions.

While processing the specified bytecode program, for each datum that would be popped off the stack for processing by a bytecode instruction, the verifier pops off the same number of data type value off the virtual stack 342 and compares the data type values with the data type requirements of the bytecode. For each datum that would be pushed onto the stack by a bytecode instruction, the verifier pushes onto the virtual stack a corresponding data type value.

One aspect of program verification in accordance with present invention is verification that the number and data type of the operands in the operand stack status is identical every time a particular instruction is executed. If a particular bytecode instruction can be immediately preceded in execution by two or more different instructions, then the virtual stack status immediately after processing of each of those different instructions must be compared. Usually, at least one of the different preceding instructions will be a conditional or unconditional jump or branch instruction. A corollary of the above "stack consistency" requirement is that each program loop must not result in a net addition or reduction in the number of operands stored in the operand stack.

The stack snapshot storage structure 346 is used to store "snapshots" of the stack counter 342 and virtual stack 344 to enable efficient comparison of the virtual stack status at various points in the program. Each stored stack snapshot is of the form:

SC, DT1, DT2, DT3, ..., DTn where SC is the stack counter value, DT1 is the first data type value in the virtual operand stack, DT2 is the second data type value in the virtual operand stack, and so on through DTn which is the data type value for the last possible item in the virtual operand stack.

The stack snapshot storage structure 346 is bifurcated into a directory portion 348 and a snapshot storage portion 350. The directory portion 348 is used to store target instruction identifiers (e.g., the absolute or relative address of each target instruction) while the snapshot portion 350 is used to store virtual stack 344 snapshots associated with the target instruction identifiers.

"Target" instructions are defined to be all bytecode instructions that can be the destination of a jump or branch instruction. For example, a conditional branch instruction includes a condition (which may or may not be satisfied) and a branch indicating to which location (target) in the program the execution is to "jump" in the event the condition is satisfied. In evaluating a conditional jump instruction, the verifier 300 utilizes the stack snapshot storage structure 346 to store both the identity of the target location (in the directory portion 348) and the status of the virtual stack 344 (in the snapshot portion 350) just before the jump. The operation of the stack snapshot storage structure 346 will be explained in greater detail below in conjunction with the description of the execution of the bytecode verifier program.

As was described previously, the bytecode program 350 includes a plurality of data type specific instructions, each of which is evaluated by the verifier 300 of the present invention. The bytecode program 350 includes instructions for stack manipulations 352 and 354 (push integer onto the stack and pop integer from the stack respectively), a forward jump 356 and its associated target 364, a backwards jump 366 and its associated target 362, and a do loop 358 and its associated end 360 (which may be an unconditional or conditional branch instruction, depending on the type of do loop). Since the verifier 240 of the preferred embodiment of the present invention only seeks to verify stack manipulations and data type compatibilities, the operation of the bytecode verifier can be explained using this representative set of instructions.

Referring now to FIGS. 4A–4G, and Appendix 1, the execution of the bytecode verifier program 240 will be described in detail. Appendix 1 lists a pseudocode representation of the verifier program. The pseudocode used in Appendix 1 is, essentially, a computer language using universal computer language conventions. While the pseudocode employed here has been invented solely for the purposes of this description, it is designed to be easily understandable by any computer programmer skilled in the art.

Figure 4A:
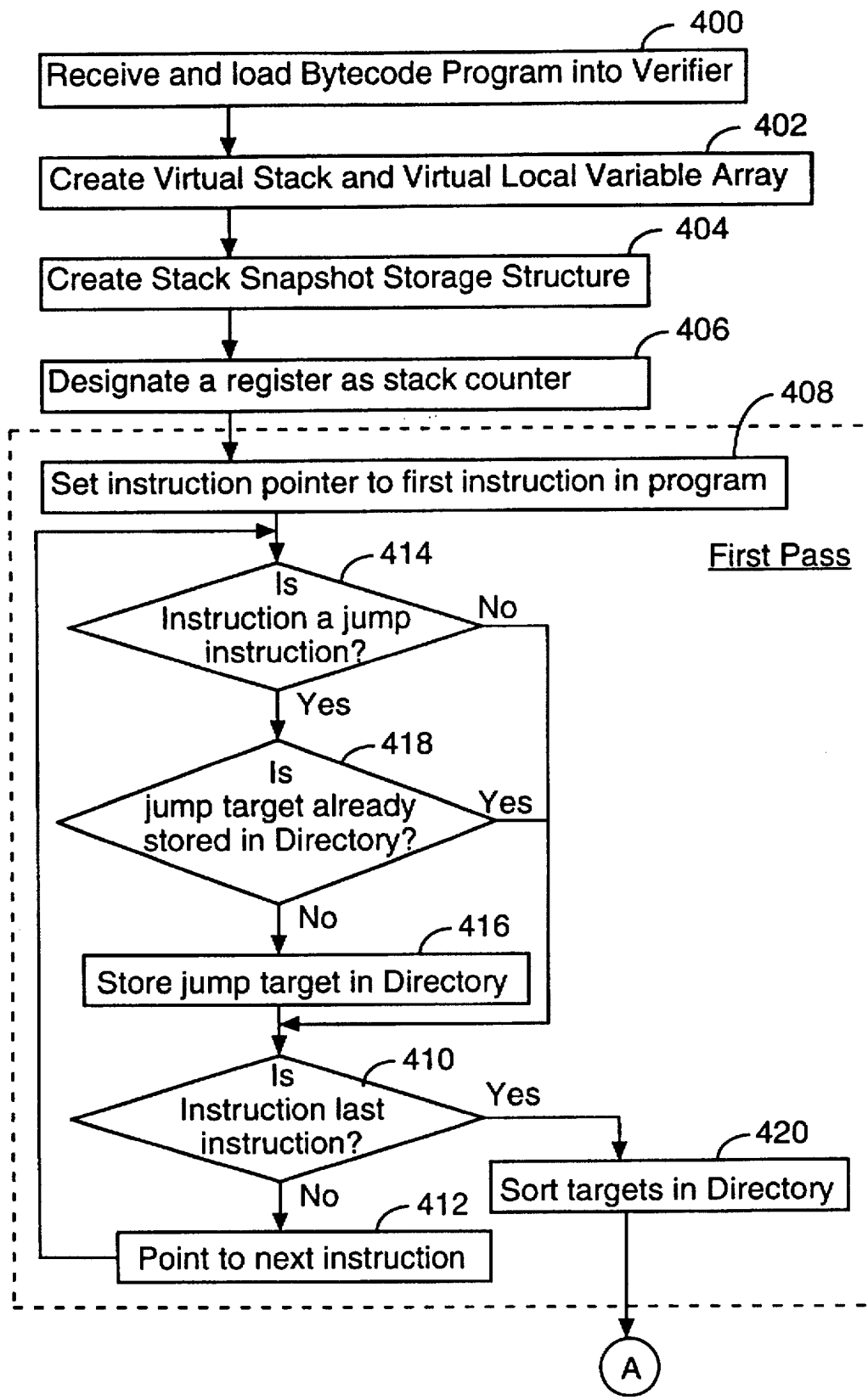
FIGS. 4, 4A–4G represent a flow chart of the bytecode program verification process in the preferred embodiment of the present invention.

As shown in FIG. 4A, the downloaded bytecode program is loaded (400) into the bytecode verifier 300 for processing. The verifier 300 creates (402) the virtual stack 344 and creates the virtual local variable array 345 by designating arrays of locations in memory to store operand and local variable data type information. Similarly, the verifier creates (404) the stack snapshot storage structure by designating an array of locations in memory to store snapshot information. Finally, the verifier designates (406) a register to act as a stack counter 342 for keeping track of the number of virtual stack entries.

A first pass is made through the bytecode program in order to extract target information associated with conditional and un-conditional jumps and loop instructions. In this first pass the verifier 300 sequentially processes all the instructions (steps 408, 410, 412), and for each instruction that is a conditional or unconditional jump (step 414) a representation of the target location for the jump is stored (step 416) in the directory portion 348 of the stack snapshot storage structure 346, unless (step 418) the target location has already been stored in the directory 348. For instance, the absolute or relative address of the target instruction may be stored in the next available slot of the directory 348. All other types of bytecode instructions are ignored on this first pass.

After all the instructions in the program have been processed, the directory 348 is preferably sorted to put the target locations noted in the directory in address sequential order.

Referring again to FIG. 3, for the purposes illustration the stack snapshot storage structure 346 has been loaded with the information which would have been stored in the directory portion 348 as if the first pass of the verification had been completed based on the bytecode instructions shown in bytecode program 350. Specifically, the directory portion has been loaded with the addresses associated with all of the targets of the conditional and unconditional jumps resident in the bytecode program.

Figures 4, 4B:
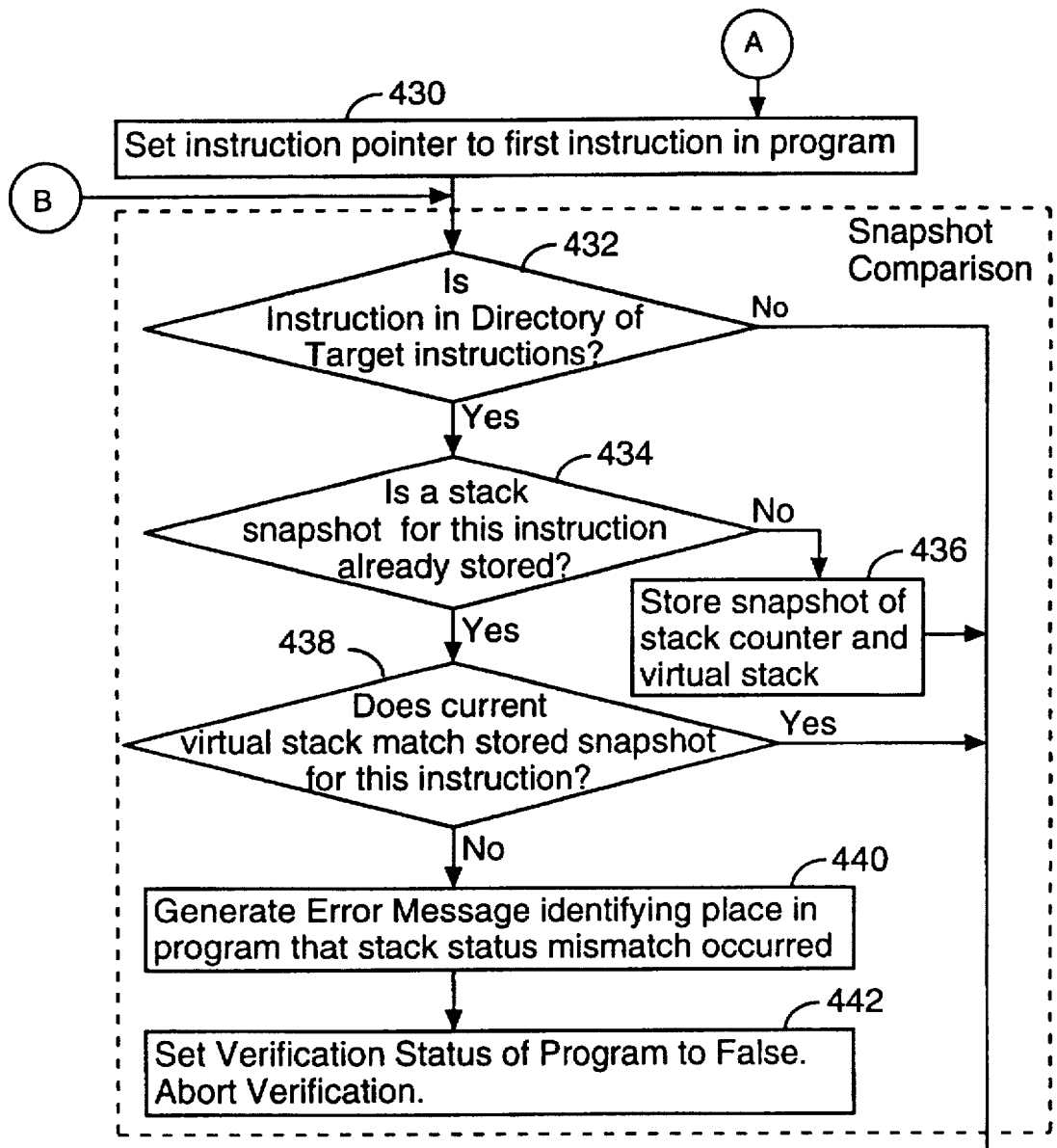

Referring now to FIG. 4B, a second pass through the bytecode program is initiated in order to verify proper use of the operand stack and of data types by the bytecode program. The first instruction of the bytecode program is selected (430) and the verifier first checks (432) to see if the address for the selected instruction has been stored in the directory portion 348 of the stack snapshot storage structure 346 in the first pass described above.

If the address of the selected instruction is in the directory 348, indicating that the selected instruction is the target of a conditional or un-conditional jump, the verifier checks (434) to see if an associated stack snapshot has been stored in the snapshot portion 350 of the stack snapshot storage structure 346. If a stack snapshot has not been stored (indicating that the instruction is a target of a backward jump), then the contents of the virtual stack and the stack counter are stored (436) in the stack snapshot storage structure 346. The snapshot contains information on the status of the virtual stack just before the execution of the instruction being processed, including a data type value for each datum that has been pushed onto the stack.

If a stack snapshot has been stored for the currently selected instruction (indicating that a jump instruction associated with this target instruction has already been processed), then the verifier compares (438) the virtual stack snapshot information stored in the snapshot portion 350 of the stack snapshot storage structure 346 for the currently selected instruction with the current state of the virtual stack. If the comparison shows that the current state and the snapshot do not match, then an error message or signal is generated (440) identifying the place in the bytecode program where the stack status mismatch occurred. In the preferred embodiment, a mismatch will arise if the current virtual stack and snapshot do not contain the same number or types of entries. The verifier will then set a verification status value 245 for the program to false, and abort (442) the verification process. Setting the verification status value 245 for the program to false prevents execution of the program by the bytecode interpreter 242 (FIG. 2).

If the current virtual stack and the stored stack snapshot for the current instruction match (438), then the verifier will continue the verification process and analyze the individual instruction, starting at step 450, as described below.

If the address of the currently selected instruction is not found within the directory portion 348 of the stack snapshot storage structure 346 or if a stack status mismatch is not detected, then the verifier performs selected ones of a series of checks on the instruction depending on the particular instructions stack usage and function.

Figure 4C:
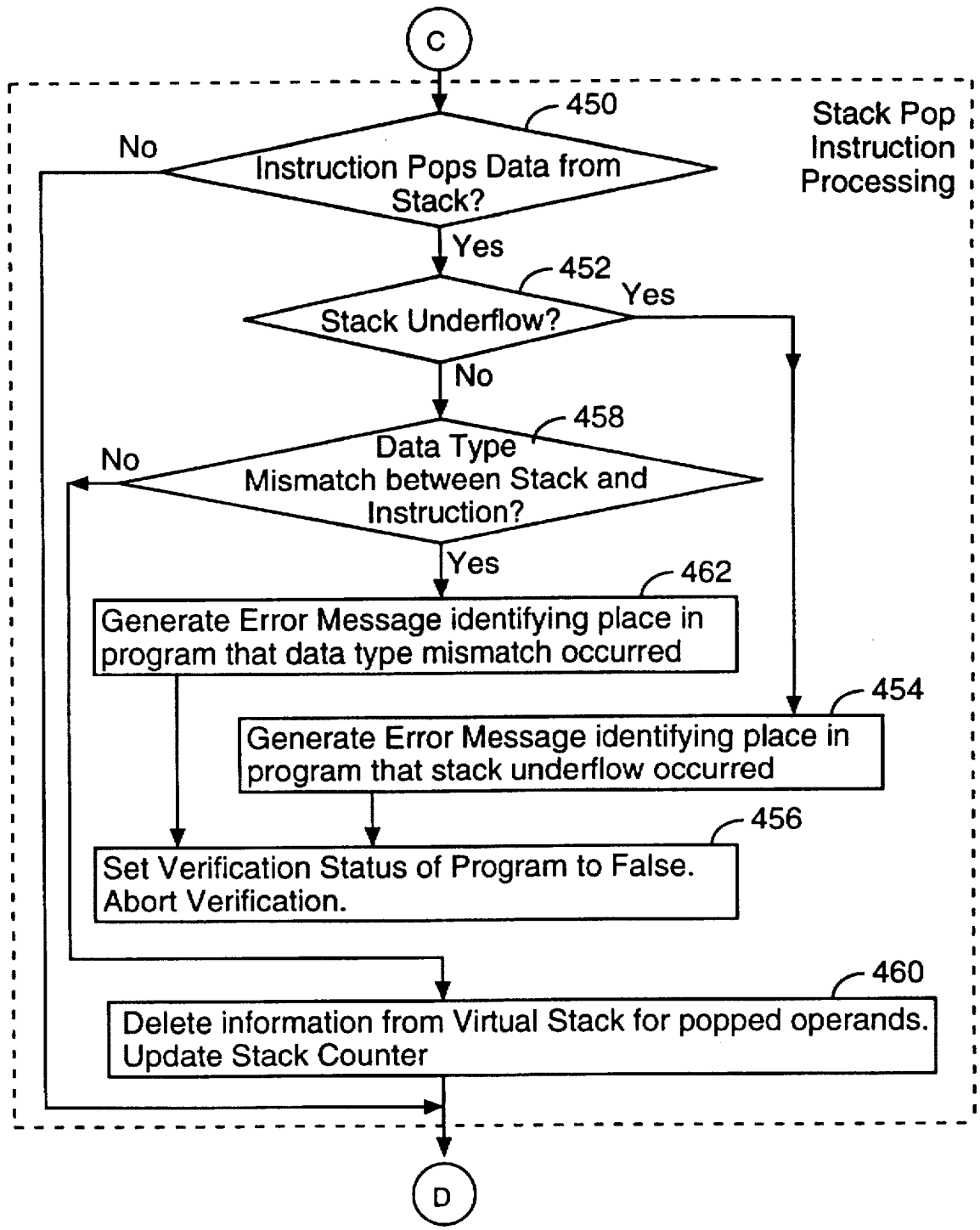

Referring to FIG. 4C, the first check to be performed concerns instructions that pop data from the operand stack. If the currently selected instruction pops data from the stack (450), the stack counter is inspected (452) to determine whether there is sufficient data in the stack to satisfy the data pop requirements of the instruction.

If the operand stack has insufficient data (452) for the current instruction, that is called a stack underflow, in which case an error signal or message is generated (454) identifying the place in the program that the stack underflow was detected. In addition, the verifier will then set a verification status value 245 for the program to false, and abort (456) the verification process.

If no stack underflow condition is detected, the verifier will compare (458) the data type code information previously stored in the virtual stack with the data type requirements (if any) of the currently selected instruction. For example, if the opcode of the instruction being analyzed calls for an integer add of a value popped from the stack, the verifier will compare the operand information of the item in the virtual stack which is being popped to make sure that is of the proper data type, namely integer. If the comparison results in a match, then the verifier deletes (460) the information from the virtual stack associated with the entry being popped and updates the stack counter 342 to reflect the number of entries popped from the virtual stack 344.

If a mismatch is detected (458) between the stored operand information in the popped entry of the virtual stack 344 and the data type requirements of the currently selected instruction, then a message is generated (462) identifying the place in the bytecode program where the mismatch occurred. The verifier will then set a verification status value 245 for the program to false and abort (456) the verification process. This completes the pop verification process.

Figure 4D:
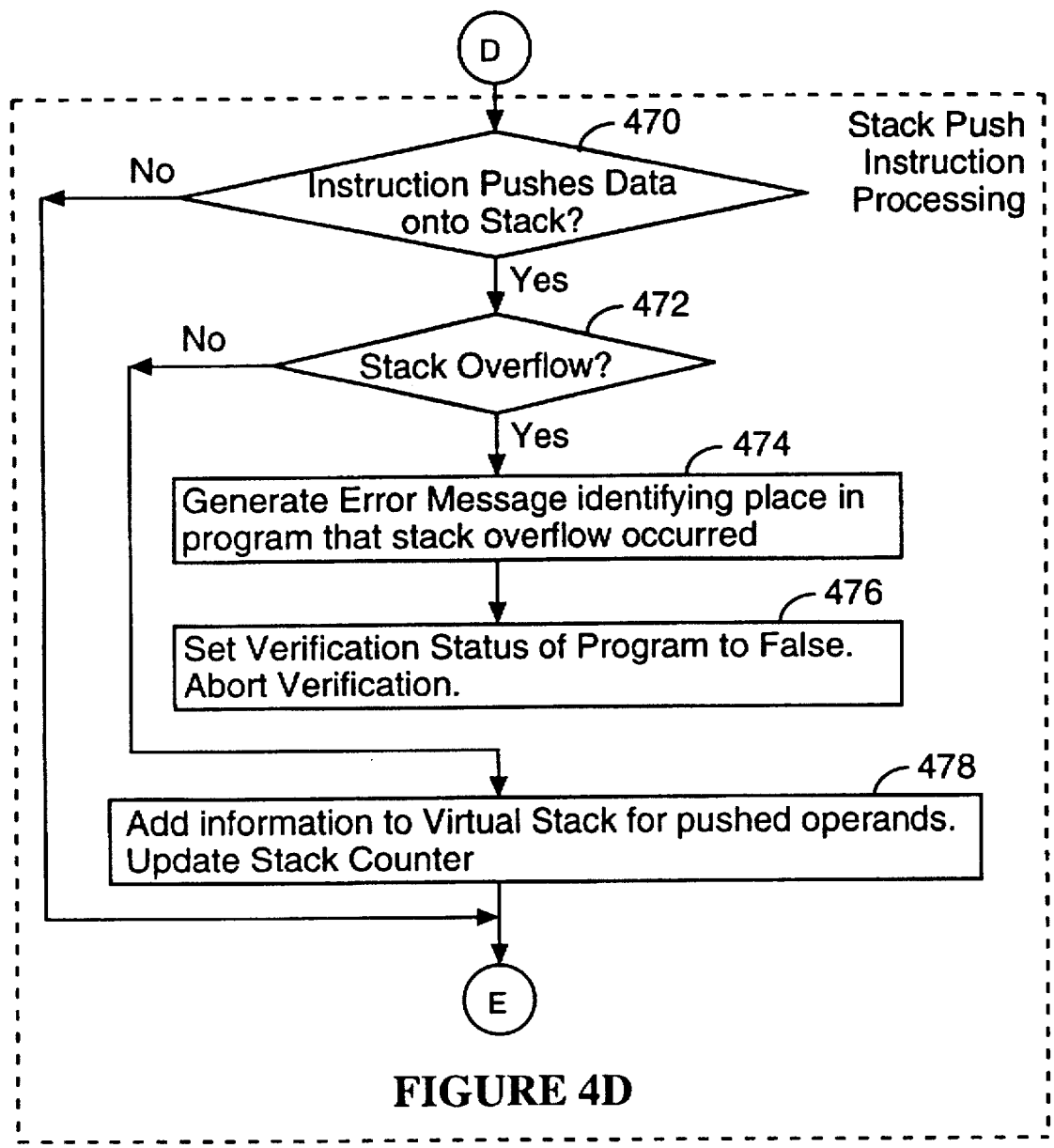

Referring to FIG. 4D, if the currently selected instruction pushes data onto the stack (470), the stack counter is inspected (472) to determine whether there is sufficient room in the stack to store the data the selected instruction will push onto the stack. If the operand stack has insufficient room to store the data to be pushed onto the stack by the current instruction (472), that is called a stack overflow, in which case an error signal or message is generated (474) identifying the place in the program that the stack underflow was detected. In addition, the verifier will then set a verification status value 245 for the program to false, and abort (476) the verification process.

If no stack overflow condition is detected, the verifier will add (478) an entry to the virtual stack indicating the type of data (operand) which is to be pushed onto the operand stack (during the actual execution of the program) for each datum to be pushed onto the stack by the currently selected instruction. This information is derived from the data type specific opcodes utilized in the bytecode program of the preferred embodiment of the present invention. The verifier also updates the stack counter 342 to reflect the added entry or entries in the virtual stack. This completes the stack push verification process.

Figure 4E:
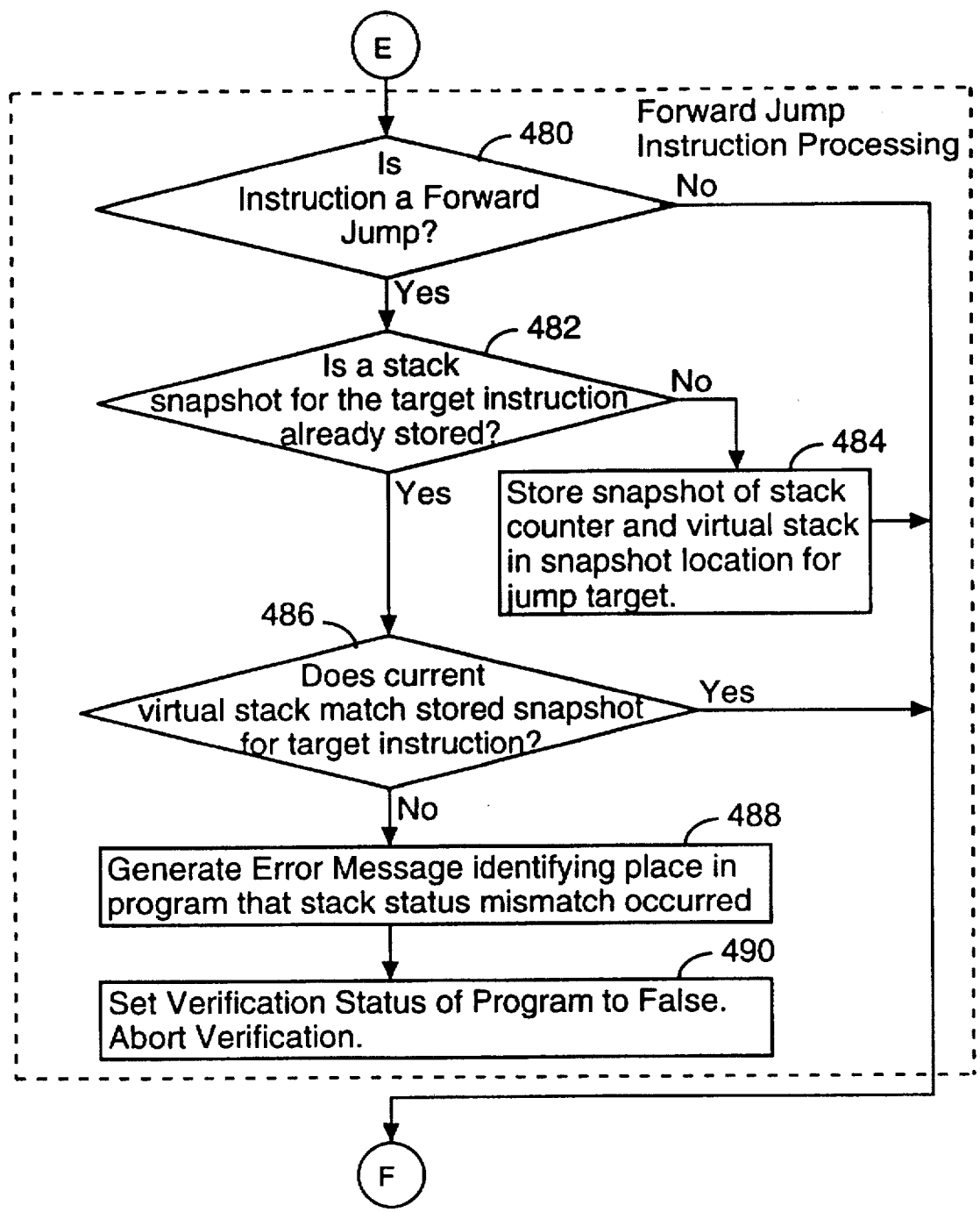

Referring to FIG. 4E, if the currently selected instruction causes a conditional or unconditional jump or branch forward in the program beyond the ordinary sequential step operation (step 480) the verifier will first check (482) to see if a snapshot for the target location of the jump instruction is stored in the stack snapshot storage structure 346. If a stack snapshot has not been stored, then the virtual stack configuration (subsequent to any virtual stack updates associated with the jump) is stored (484) in the stack snapshot storage structure 346 at a location associated with the target program location. Note that any stack pop operations associated with the jump will have already been reflected in the virtual stack by the previously executed step 460 (see FIG. 4C).

If a stack snapshot has been stored (indicating that another entry point associated with this target instruction has already been processed), then the verifier compares (486) the virtual stack snapshot information stored in the snapshot portion 340 of the stack snapshot storage structure 346 with the current state of the virtual stack. If the comparison shows that the current state and the snapshot do not match, then an error message is generated (488) identifying the place in the bytecode program where the stack status mismatch occurred. In the preferred embodiment, a mismatch will arise if the current virtual stack and snapshot do not contain the same number or types of entries. Furthermore, a mismatch will arise if one or more data type values in the current virtual stack do not match corresponding data type values in the snapshot. The verifier will then set a verification status value 245 for the program to false and abort (490) the verification process. If a stack status match is detected at step 486, then the verifier continues processing at step 500 (FIG. 4F).

Figure 4F:
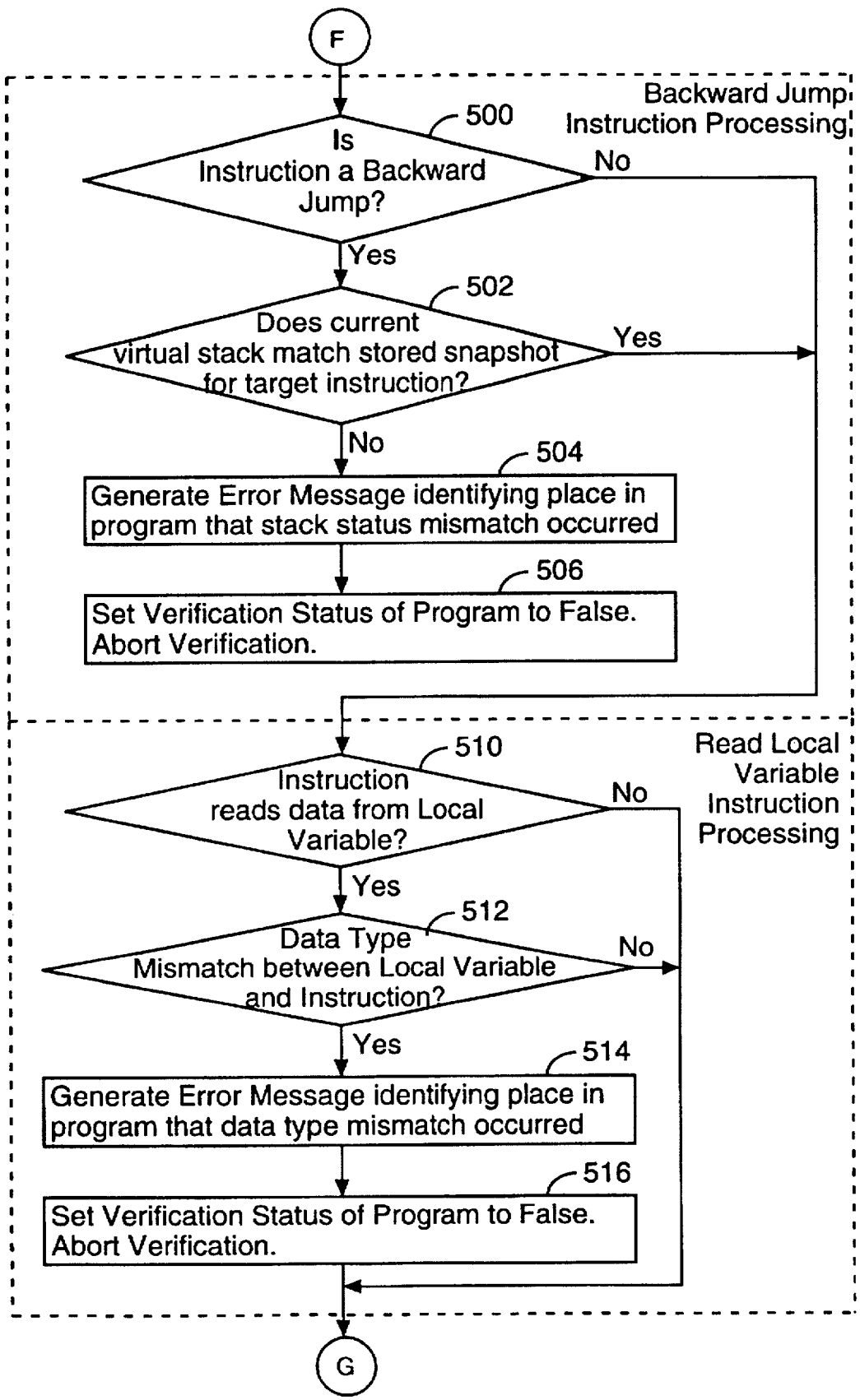

Referring to FIG. 4F, if the currently selected instruction causes a conditional or unconditional jump or branch backward in the program (step 500) then the verifier compares (502) the virtual stack snapshot information stored in the snapshot portion 340 of the stack snapshot storage structure 346 associated with the target of the backward jump (which has already been stored in step 436) with the current state of the virtual stack. If the comparison shows that the current state and the snapshot do not match, then an error message is generated (504) identifying the place in the bytecode program where the stack status mismatch occurred. In the preferred embodiment, a mismatch will arise if the current virtual stack and snapshot do not contain the same number or types of entries or if any data type entry in the current virtual stack does not match the corresponding data type entry in the snapshot. The verifier will then set a verification status value 245 for the program to false and abort (506) the verification process. If a stack status match is detected (at step 502) or if the instruction is not a backward jump (at step 500), then the verifier continues processing at step 510.

If the currently selected instruction reads data from a local variable (510), the verifier will compare (512) the data type code information previously stored in the corresponding virtual local variable with the data type requirements (if any) of the currently selected instruction. If a mismatch is detected (512) between the data type information stored in the virtual local variable and the data type requirements of the currently selected instruction, then a message is generated (514) identifying the place in the bytecode program where the mismatch occurred. The verifier will then set a verification status value 245 for the program to false and abort (516) the verification process.

If the currently selected instruction does not read data from a local variable (510) or the data type comparison at step 512 results in a match, then the verifier continues processing the currently selected instruction at step 520.

Figure 4G:
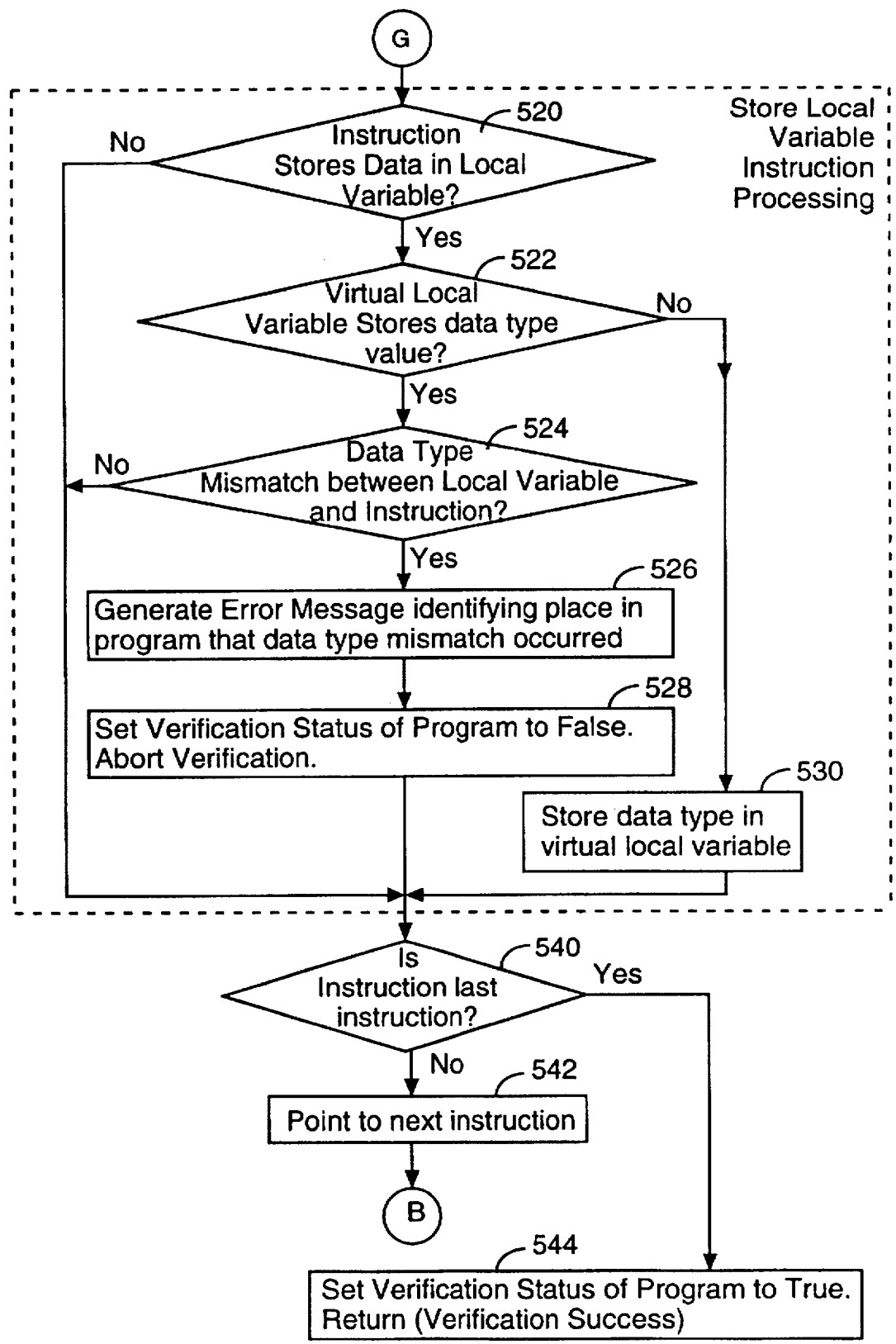

Referring to FIG. 4G, if the currently selected instruction stores data into a local variable (520), the corresponding virtual local variable is inspected (522) to determine whether it stores a data type value. If the virtual local variable does store a data type value (indicating that data has been previously stored in the local variable), the verifier compares the data type information in the virtual local variable with the data type associated with the currently selected bytecode instruction (524). If a mismatch is detected (524) between the data type information stored in the virtual local variable and the data type requirements of the currently selected instruction, then a message is generated (526) identifying the place in the bytecode program where the mismatch occurred. The verifier will then set a verification status value 245 for the program to false and abort (528) the verification process.

If the currently selected instruction does not store data into a local variable (520) processing for the currently selected instruction is completed. If the currently selected instruction stores data into a local variable, but the virtual local variable does not store a data type value (indicating that no instruction which would store data in the local variable has yet been processed by the verifier), then the data type associated with the selected bytecode instruction is stored in the virtual local variable (step 530).

Next, the verifier checks (540) to see if this is the last instruction in the bytecode program 340 to be processed. If more instructions remain to be processed, then the verifier loads (542) the next instruction, and repeats the verification process starting at step 432. If no more instructions are to be processed, then the verifier will then set a verification status value 245 for the program to True (544), signaling the completion of the verification process.

Bytecode Interpreter

Figure 5:
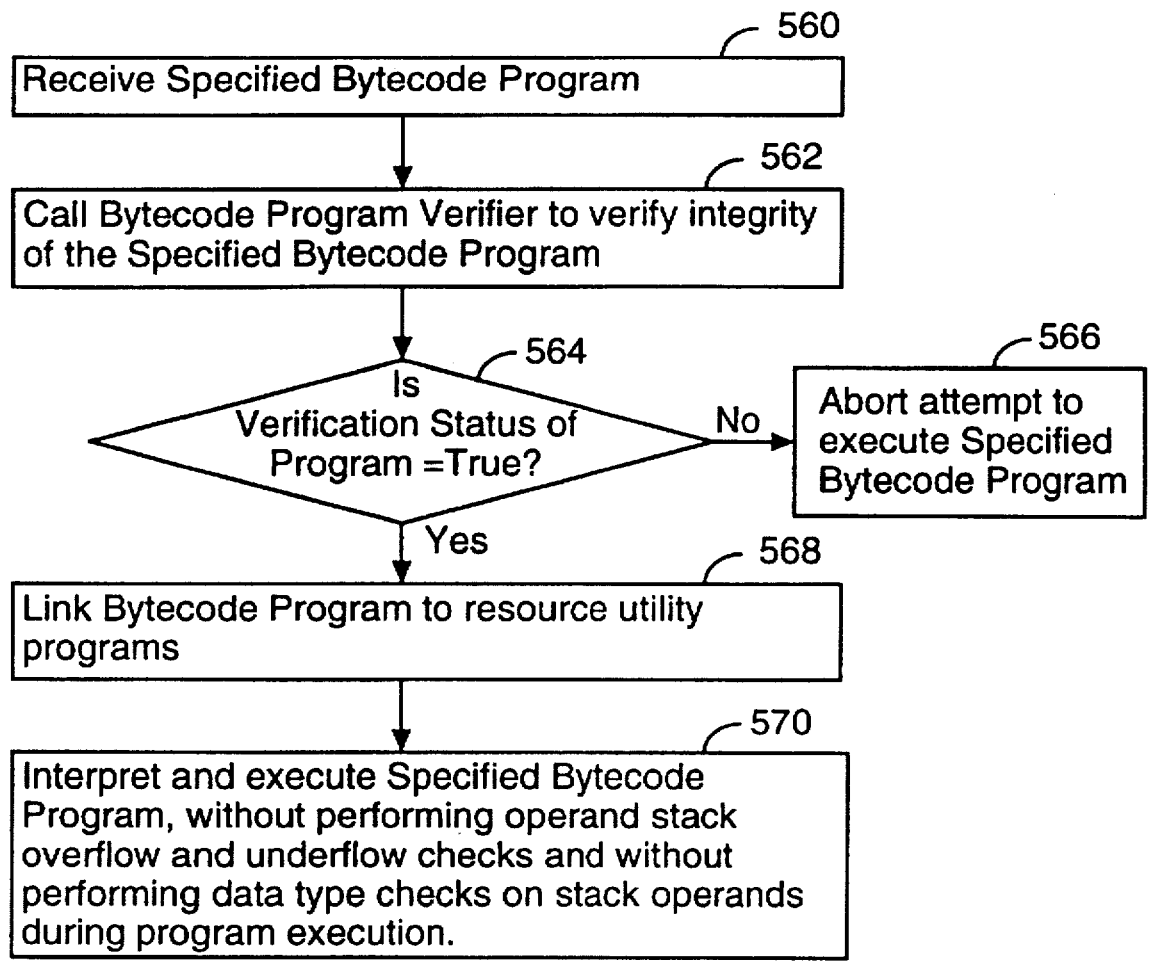
FIG. 5 represents a flow chart of the bytecode program interpreter process in the preferred embodiment of the present invention.

Referring to flow chart in FIG. 5 and Appendix 2, the execution of the bytecode interpreter 242 will be described. Appendix 2 lists a pseudocode representation of the bytecode interpreter.

After a specified bytecode program has been received or otherwise selected (560) as a program to be executed, the bytecode program interpreter 242 calls (562) the bytecode verifier 240 to verify the integrity of the specified bytecode program. The bytecode verifier is described above.

If the verifier returns a "verification failure" value (564), the attempt to execute the specified bytecode program is aborted by the interpreter (566).

If the verifier 242 returns a "Verification Success" value (564), the specified bytecode program is linked (568) to resource utility programs and any other programs, functions and objects that may be referenced by the program. Such a linking step is a conventional pre-execution step in many program interpreters. Then the linked bytecode program is interpreted and executed (570) by the interpreter. The bytecode interpreter of the present invention does not perform any operand stack overflow and underflow checking during program execution and also does not perform any data type checking for data stored in the operand stack during program execution. These conventional stack overflow, underflow and data type checking operations can be skipped by the present invention because the interpret has already verified that errors of these types will not be encountered during program execution.

The program interpreter of the present invention is especially efficient for execution of bytecode programs having instruction loops that are executed many times, because the operand stack checking instructions are executed only once for each bytecode in each such instruction loop in the present invention. In contrast, during execution of a program by a convention interpreter, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program. As a result, the interpreter of the present invention will often execute programs at two to five times the speed of a conventional program interpreter running on the same computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

TABLE 1

BYTECODES IN OAK LANGUAGE

| INSTRUCTION NAME | SHORT DESCRIPTION |
|---|---|
| aaload | load object reference from array |
| aastore | store object reference into object reference array |
| aconst_null | push null object |
| aload | load local object variable |
| areturn | return object reference from function |
| arraylength | get lenth of array |
| astore | store object reference into local variable |
| astore_<n> | store object reference into local variable |
| athrow | throw exception |
| bipush | push one-byte signed integer |
| breakpoint | call breakpoint handler |
| catchsetup | set up exception handler |
| catchteardown | reset exception handler |
| checkcast | make sure object is of a given type |
| d2f | convert double floating point number to single precision floating point number |
| d2i | convert double floating point number to integer |
| d2I | convert double floating point number to long integer |
| dadd | add double floating point numbers |
| daload | load double floating point number from array |
| dastore | store double floating point number into array |
| dcmpg | compare two double floating point numbers (return 1 on incomparable) |
| dcmpl | compare two double floating point numbers (return -1 on incomparable) |
| dconst_<d> | push double floating point number |
| ddiv | divide double floating point numbers |
| dload | load double floating point number from local variable |
| dload_<n> | load double floating point number from local variable |
| dmod | perform modulo function on double floating point numbers |
| dmul | multiply double floating point numbers |
| dneg | negate double floating point number |
| dreturn | return double floating point number from function |
| dstore | store double floating point number into local variable |
| dstore_<n> | store double floating point number into local variable |
| dsub | subtract double floating point numbers |
| dup | duplicate top stack word |
| dup2 | duplicate top two stack words |
| dup2_x1 | duplicate top two stack words and put two down |
| dup2_x2 | duplicate top two stack words and put three down |
| dup_x1 | dulicate top stack word and put two down |
| dup_x2 | duplicate top stack word and put three down |
| f2d | convert single precision floating point number to double floating point number |
| f2i | convert single precision floating point number to integer |
| f2l | convert Single precision floating point number to long integer |
| fadd | add single precision floating point numbers |
| faload | load single precision floating point number from array |
| fastore | store into single precision floating point number array |
| fcmpg | compare single precision floating point numbers (return 1 on incomparable) |
| fcmpl | compare Single precision floating point number (return -1 on incomparable) |
| fconst_<f> | push single precision floating point number |
| fdiv | divide single precision floating point numbers |
| fload | load single precision floating point number from local variable |
| fload_<n> | load single precision floating point number from local variable |
| fmod | perform modulo function on single precision floating point numbers |
| fmul | multiply single precision floating point numbers |

TABLE 1-continued

BYTECODES IN OAK LANGUAGE

| INSTRUCTION NAME | SHORT DESCRIPTION |
|---|---|
| fneg | negate single precision floating point number |
| freturn | return single precision floating point number from function |
| fstore | store single precision floating point number into local variable |
| fstore_<n> | store single precision floating point number into local variable |
| fsub | subtract single precision floating point numbers |
| getfield | fetch field from object |
| getstatic | set static field from class |
| goto | branch always |
| i2d | convert integer to double floating point number |
| i2f | convert integer to single precision floating point number |
| i2l | convert integer to long integer |
| iadd | add integers |
| iaload | load integer from array |
| iand | boolean AND two integers |
| iastore | store into integer array |
| iconst_<n> | push integer |
| iconst_m1 | push integer constant minus 1 |
| idiv | integer divide |
| if_acmpeq | branch if objects same |
| if_acmpne | branch if objects not same |
| if_icmpeq | branch if integers equal |
| if_icmpge | branch if integer greater than or equal to |
| if_icmpgt | branch if integer greater than |
| if_icmple | branch if integer less than or equal to |
| if_icmplt | branch if integer less than |
| if_icmpne | branch if integers not equal |
| ifeq | branch if equal to 0 |
| ifge | branch if greater than or equal to 0 |
| ifgt | branch if greater than 0 |
| ifle | branch if less than or equal to 0 |
| iflt | branch if less than 0 |
| ifne | branch if not equal to 0 |
| iinc | increment local variable by constant |
| iload | load integer from local variable |
| iload_<n> | load integer from local variable |
| imod | peform modulo function on integers |
| imul | multiply integers |
| ineg | negate integer |
| instanceof | determine if object is of given type |
| int2byte | convert integer to signed byte |
| int2char | convert integer to char |
| invokeinterface | invoke interface method |
| invokemethod | invoke class method |
| invokesuper | invoke superclass method |
| ior | boolean OR two integers |
| ireturn | return integer from function |
| ishl | integer shift left |
| Ishr | integer arithmetic shift right |
| istore | store integer into local variable vindex |
| istore_<n> | store integer into local variable n |
| isub | subtract integers |
| iushr | integer logical shift right |
| ixor | boolean XOR two integers |
| jsr | jump to subroutine |
| l2d | convert long integer into double floating point number |
| l2f | convert long integer into single precision floating point number |
| l2i | convert long integer into integer |
| ladd | add long integers |
| laload | load long integer from array |
| land | boolean AND two long integers |
| lastore | store into long integer array |
| lcmp | compare long integers |
| lconst_<l> | push long integer constant |
| ldc1 | push item from constant pool |
| ldc2 | push item from constant pool |
| ldc2w | push long or double from constant pool |
| ldiv | divide long integers |
| lload | load long integer from local variable |
| lload_<n> | load long integer from local variable |
| lmod | perform modulo function on long integers |
| lmul | multiply long integers |
| lneg | Negate long integer |
| lookupswitch | Access jump table by key match and jump |
| lor | boolean OR two long integers |
| lreturn | return long integer from function |
| lshl | long integer shift left |
| lshr | long integer arithmetic shift right |
| lstore | store long integer into local variable |
| lstore_<n> | store long integer into local variable |
| lsub | subtract long integers |
| lushr | long integer logical shift right |
| lxor | boolean XOR long integers |
| monitorenter | enter monitored region of code |
| monitorexit | exit monitored region of code |
| new | create new object |
| newarray | allocate new array |
| newfromname | create new object from name |
| nop | do nothing |
| pop | pop top stack word |
| pop2 | pop top two stack words |
| putfield | set field in object |
| putstatic | set static field in class |
| ret | return from subroutine |
| return | return (void) from procedure |
| saload | load signed byte from array |
| sastore | store into signed byte array |
| siaload | load unsigned short from array |
| siastore | store into unsigned short array |
| sipush | push two-byte signed integer |
| tableswitch | access jump table by index and jump |
| verifystack | verify stack empty |

APPENDIX 1

Pseudocode for OAK Bytecode Verifier

Receive Bytecode Program to be verified.
Create Virtual Operand Stack Data Structure for storing stack status information and Virtual Local Variable Array for storing local variable data type information.
Create data structure for storing Virtual Stack Snapshots.
First Pass through Bytecode Program:
    Locate all instructions that are the targets of conditional and unconditional jumps or branches (i.e., can be entered from more than one prior instruction).
    Store list of such target instructions in Virtual Stack Snapshot data structure.
Second Pass through Bytecode Program:
    Set VerificationSuccess to True
    Do Until Last Bytecode Instruction has been processed:
    {
    Select next bytecode instruction (in sequential order in program)
    If instruction is in list of target instructions
    {
      If snapshot of virtual stack for this instruction already exists
      {
      Compare current state of virtual stack with stored snapshot
      If snapshot does not match current virtual stack state
      {
      Print message identifying place in program that stack mismatch occurred
      Abort Verification
      Set VerificationSuccess to False
      Return
      }
    }
    Else
      Store snapshot of current virtual stack status
    }

APPENDIX 1-continued

Pseudocode for OAK Bytecode Verifier

```
Case(Instruction Type):
{
  Case=Instruction pops data from Operand Stack
  {
    Check for Stack Underflow
    If Stack has Underflowed
    {
      Print message identifying place in program that
        underflow occurred
      Abort Verification
      Return
    }
    Compare data type of each operand popped from stack with
      data type required (if any) by the bytecode instruction
    If type mismatch
    {
      Print message identifying place in program that data
        type mismatch occurred
      Set VerificationSuccess to False
    }
    Delete information from Virtual Stack for popped operands
    Update Stack Counter
  }
  Case=Instruction pushes data onto Operand Stack
  {
    Check for Stack Overflow
    If Stack has Overflowed
    {
      Print message identifying place in program that overflow
        occurred
      Abort Verification
      Set VerificationSuccess to False
      Return
    }
    Add information to Virtual Stack indicating data type of
      data pushed onto operand stack
    Update Stack Counter
  }
  Case=Instruction is a forward jump or branch instruction
  {
    If snapshot of virtual stack for the target instruction already
      exists
    {
      Compare current state of virtual stack with stored
        snapshot
      If snapshot does not match current virtual stack state
      {
        Print message identifying place in program that
          stack mismatch occurred
        Abort Verification
        Set VerificationSuccess to False
        Return
      }
    }
    Else
      Store snapshot of current virtual stack state as snapshot
        for the target instruction;
  }
  Case=Instruction is an end of loop backward jump or other
    backward jump or branch instruction:
  {
    Compare current virtual stack state with stored snapshot for
      target instruction
    If current virtual stack state does not match stored snapshot
    {
      Print message identifying place in program that stack
        mismatch occurred
      Abort Verification
      Set VerificationSuccess to False
      Return
    }
  }
  Case=Instruction reads data from local variable
  {
    Compare data type of each datum read from local variable
      with data type required (if any) by the bytecode instruction
    If type mismatch
    {
      Print message identifying place in program that data
        type mismatch occurred
      Set VerificationSuccess to False
    }
  }
  Case=Instruction stores data into a local variable
  {
    If corresponding virtual local variable already stores a data
      type value
    {
      Compare data type value stored in virtual local variable
        with data type of datum that would be stored in the
        corresponding local variable (as determined by the data
        type handled by the current bytecode instruction)
      If type mismatch
      {
        Print message identifying place in program that data
          type mismatch occurred
        Set VerificationSuccess to False
      }
    }
    Else
      Add information to Virtual Local Variable indicating data
        type of data that would be stored in corresponding local
        variable
  }
} /* EndCase */
} /* End of Do Loop */
Return (VerificationSuccess)
```

APPENDIX 2

Pseudocode for Bytecode Interpreter

```
Receive Specified Bytecode Program to be executed
Call Bytecode Verifier to verify Specified Bytecode Program
If Verification Success
{
  Link Specified Bytecode Program to resource utility programs.
  Interpret and execute Specified Bytecode Program instructions
  without performing operand stack overflow and underflow checks
  and without performing data type checks on operands stored
  in operand stack.
}
```

What is claimed is:

1. A method of operating a computer system, the steps of the method comprising:

(A) storing a program in a memory, the program including a sequence of bytecodes, where each of a multiplicity of said bytecodes each represents an operation on data of a specific data type; said each bytecode having associated data type restrictions on the data type of data to be manipulated by said each bytecode;

(B) prior to execution of said program, preprocessing said program by determining whether execution of any bytecode in said program would violate said data type restrictions for that bytecode and generating a program fault signal when execution of any bytecode in said program would violate the data type restrictions for that bytecode;

(C) when said preprocessing of said program results in the generation of no program fault signals, enabling execution of said program;

(D) when said preprocessing of said program results in the generation of a program fault, preventing execution of said program; and (E) when execution of said bytecode program has been enabled, executing said bytecode program without performing data type checks on operands stored in said operand stack during execution of said bytecode program;

said bytecode program including at least one execution loop;

said step (B) including determining the state of a virtual stack associated with said program before and after execution of each said bytecode in the program, said virtual stack state storing data type values for operands that would be stored in an operand stack during execution of said program; and determining whether execution of any loop in said program would result in a net addition or deletion of operands to said operand stack, and for generating a program fault signal when execution of any loop in said program would produce a net addition or deletion of operands to said operand stack; and said executing step including executing said bytecode program without performing operand stack underflow and overflow checks during execution of said bytecode program.

2. A method of operating a computer system, the steps of the method comprising:

(A) storing a program in a memory, the program including a sequence of bytecodes, where each of a multiplicity of said bytecodes each represents an operation on data of a specific data type; said each bytecode having associated data type restrictions on the data type of data to be manipulated by said each bytecode;

(B) prior to execution of said program, preprocessing said program by determining whether execution of any bytecode in said program would violate said data type restrictions for that bytecode and generating a program fault signal when execution of any bytecode in said program would violate the data type restrictions for that bytecode;

(C) when said preprocessing of said program results in the generation of no program fault signals, enabling execution of said program;

(D) when said preprocessing of said program results in the generation of a program fault, preventing execution of said program; and (E) when execution of said bytecode program has been enabled, executing said bytecode program without performing data type checks on operands stored in said operand stack during execution of said bytecode program;

said bytecode program including a plurality of jump/branch bytecodes;

said step (B) including determining, whenever two or more bytecodes in said program comprise jumps/branches to an identical location in said program, whether the states of a virtual stack are identical prior to execution of each of said jump/branches, said virtual stack state storing data type values for operands that would be stored in an operand stack during execution of said program, and for generating a program fault signal if said virtual stack states are not identical; and said executing step (E) including executing said bytecode program without performing operand stack status checks during execution of said bytecode program.

3. A method of operating a computer system, the steps of the method comprising:

(A) storing a program in a memory, said program including a sequence of bytecodes, including a plurality of jump/branch bytecodes;

(B) prior to execution of said program, preprocessing said program by:

determining the state of a virtual stack associated with said program before and after execution of each said bytecode in the program, said virtual stack state storing data type values for operands that would be stored in an operand stack during execution of said program; and determining, whenever two or more bytecodes in said program comprise jumps/branches to an identical location in said program, whether the states of the virtual stack are identical prior to execution of each of said jump/branches, and generating a program fault signal if said virtual stack states are not identical;

(C) when said preprocessing of said program results in the generation of no program fault signals, enabling execution of said program;

(D) when said preprocessing of said program results in the generation of a program fault, preventing execution of said program; and (E) when execution of said program has been enabled, executing said program without performing operand stack status checks during execution of said program.

4. The method of claim 3, said step (B) including determining, whether execution of any loop in said program would result in a net addition or deletion of operands to said operand stack and generating a program fault signal when execution of any loop in said program would produce a net addition or deletion of operands to said operand stack.

5. A method of operating a computer system, the steps of the method comprising:

(A) storing a program in a memory, the program including a sequence of bytecodes, including a plurality of jump/branch bytecodes; said program including at least one execution loop;

(B) prior to execution of said program, preprocessing said program by determining the state of a virtual stack associated with said program before and after execution of each said bytecode in the program, said virtual stack state storing data type values for operands that would be stored in an operand stack during execution of said program; and determining whether execution of any loop in said program would result in a net addition or deletion of operands to said operand stack and generating a program fault signal when execution of any loop in said program would produce a net addition or deletion of operands to said operand stack;

(C) when said preprocessing of said program results in the generation of no program fault signals, enabling execution of said program;

(D) when said preprocessing of said program results in the generation of a program fault, preventing execution of said program; and (E) when execution of said program has been enabled, executing said program without performing operand stack underflow and overflow checks during execution of said program.

6. A computer system, comprising:

memory for storing a bytecode program, the bytecode program including a sequence of bytecodes, where each of a multiplicity of said bytecodes (A) represents an operation on data of a specific data type, and, (B) has associated data type restrictions on the data type of data to be manipulated by that bytecode;

a data processing unit for executing programs stored in said memory;

a bytecode program verifier, stored in said memory, said bytecode program verifier including data type testing instructions for determining whether execution of any bytecode in said program would violate said data type restrictions for that bytecode and generating a program fault signal when execution of any bytecode in said program would violate the data type restrictions for that bytecode;

program execution enabling instructions that enable execution of said bytecode program only after processing said bytecode program by said bytecode program verifier generates no program fault signals; and a bytecode program interpreter, coupled to said program execution enabling instructions, for executing said bytecode program after processing of said bytecode program by said bytecode program verifier and after said program execution enabling instructions enable execution of said bytecode program by said bytecode program interpreter; said bytecode program interpreter including instructions for executing said bytecode program without performing data type checks on operands stored in an operand stack.

7. The computer system of claim 6, said bytecode program verifier including stack status tracking instructions for determining the state of a virtual stack associated with said bytecode program before and after execution of each said bytecode in the bytecode program, said virtual stack state storing data type values for operands that would be stored in an operand stack during execution of said bytecode program;

stack overflow/underflow testing instructions for determining (A) whether execution of said bytecode program would result in an operand stack underflow or overflow, and (B) whether execution of any loop in said bytecode program would result in a net addition or deletion of operands to said operand stack, and for generating a program fault signal when execution of any loop in said bytecode program would produce a net addition or deletion of operands to said operand stack; and said executing instructions of said bytecode program interpreter including instructions for executing said bytecode program without performing operand stack underflow and overflow checks during execution of said bytecode program.

8. The computer system of claim 6, said bytecode program verifier including jump/branch inspection instructions for determining, whenever two or more bytecodes in said bytecode program comprise jumps/branches to an identical location in said bytecode program, whether the states of a virtual stack are identical prior to execution of each of said jump/branches, said virtual stack state storing data type values for operands that would be stored in an operand stack during execution of said bytecode program, and for generating a program fault signal if said virtual stack states are not identical; and said executing instructions of said bytecode program interpreter including instructions for executing said bytecode program without performing operand stack status checks during execution of said bytecode program.

9. A computer system, comprising:

memory for storing a bytecode program, the bytecode program including a sequence of bytecodes, including a plurality of jump/branch bytecodes;

a data processing unit for executing programs stored in said memory;

a bytecode program verifier, stored in said memory, said bytecode program verifier including:

stack status tracking instructions for determining the state of a virtual stack associated with said program before and after execution of each said bytecode in the program, said virtual stack state storing data type values for operands that would be stored in an operand stack during execution of said program;

jump/branch inspection instructions for determining, whenever two or more bytecodes in said program comprise jumps/branches to an identical location in said program, whether the states of the virtual stack are identical prior to execution of each of said jump/branches, and for generating a program fault signal if said virtual stack states are not identical;

program execution enabling instructions that enable execution of said bytecode program only after processing said bytecode program by said bytecode program verifier generates no program fault signals; and a bytecode program interpreter, coupled to said program execution enabling instructions, for executing said bytecode program after processing of said bytecode program by said bytecode program verifier and after said program execution enabling instructions enable execution of said bytecode program by said bytecode program interpreter; said bytecode program interpreter including instructions for executing said bytecode program without performing operand stack status checks.

10. The computer system of claim 9, said bytecode program verifier including stack overflow/underflow testing instructions for determining (A) whether execution of said bytecode program would result in an operand stack underflow or overflow, and (B) whether execution of any loop in said bytecode program would result in a net addition or deletion of operands to said operand stack, and for generating a program fault signal when execution of any loop in said bytecode program would produce a net addition or deletion of operands to said operand stack.

11. A computer system, comprising:

memory for storing a bytecode program, the bytecode program including a sequence of bytecodes, including a plurality of jump/branch bytecodes; said program including at least one execution loop;

a data processing unit for executing programs stored in said memory;

a bytecode program verifier, stored in said memory, said bytecode program verifier including:

stack status tracking instructions for determining the state of a virtual stack associated with said program before and after execution of each said bytecode in the program, said virtual stack state storing data type values for operands that would be stored in an operand stack during execution of said program;

stack overflow/underflow testing instructions for determining (A) whether execution of said program would result in an operand stack underflow or overflow, and (B) whether execution of any loop in said program would result in a net addition or deletion of operands to said operand stack and generating a program fault signal when execution of any loop in said program would produce a net addition or deletion of operands to said operand stack;

program execution enabling instructions that enables execution of said bytecode program only after processing said bytecode program by said bytecode program verifier generates no program fault signals; and a bytecode program interpreter, coupled to said bytecode program execution enabling instructions, for executing said bytecode program after processing of said bytecode program by said bytecode program verifier and after said program execution enabling instructions enable execution of said bytecode program by said bytecode program interpreter; said bytecode program interpreter including instructions for executing said bytecode program without performing operand stack overflow/underflow checks.

12. A computer readable media storing programs executable by a processor, the programs stored on the computer readable media comprising:

a bytecode program verifier for analyzing a bytecode program, the bytecode program including a sequence of bytecodes, where each of a multiplicity of the bytecodes (A) represents an operation on data of a specific data type, and (B) has associated data type restrictions on the data type of data to be manipulated by that bytecode;

the bytecode program verifier including data type testing instructions for determining whether execution of any bytecode in the bytecode program would violate the data type restrictions for that bytecode and generating a program fault signal when execution of any bytecode in the bytecode program would violate the data type restrictions for that bytecode;

program execution enabling instructions that enable execution of the bytecode program only after processing of the bytecode program by the bytecode program verifier generates no program fault signals; and a bytecode program interpreter for executing the bytecode program after processing of the bytecode program by the bytecode program verifier and after the program execution enabling instructions enable execution of the bytecode program by the bytecode program interpreter; the bytecode program interpreter including instructions for executing the bytecode program without performing data type checks on operands stored in an operand stack.

13. The computer readable media of claim 12, the bytecode program verifier including:

stack status tracking instructions for determining the state of a virtual stack associated with the bytecode program before and after execution of each bytecode in the bytecode program, the virtual stack state storing data type values for operands that would be stored in an operand stack during execution of the bytecode program;

stack overflow/underflow testing instructions for determining (A) whether execution of the bytecode program would result in an operand stack underflow or overflow, and (B) whether execution of any loop in the bytecode program would result in a net addition or deletion of operands to the operand stack, and for generating a program fault signal when execution of any loop in the bytecode program would produce a net addition or deletion of operands to the operand stack; and the executing instructions of the bytecode program interpreter including instructions for executing the bytecode program without performing operand stack underflow and overflow checks during execution of the bytecode program.

14. The computer readable media of claim 12, the bytecode program verifier including jump/branch inspection instructions for determining, whenever two or more bytecodes in the bytecode program comprise jumps/branches to an identical location in the bytecode program, whether the states of a virtual stack are identical prior to execution of each of the jump/branches, the virtual stack state storing data type values for operands that would be stored in an operand stack during execution of the bytecode program, and for generating a program fault signal if the virtual stack states are not identical; and the executing instructions of the bytecode program interpreter including instructions for executing the bytecode program without performing operand stack status checks during execution of the bytecode program.

* * * * *